May 31, 1960  R. H. GEORGE  2,938,753
AIR BRAKE SYSTEMS FOR AUTOMOTIVE VEHICLES
Filed Dec. 20, 1955  2 Sheets-Sheet 1
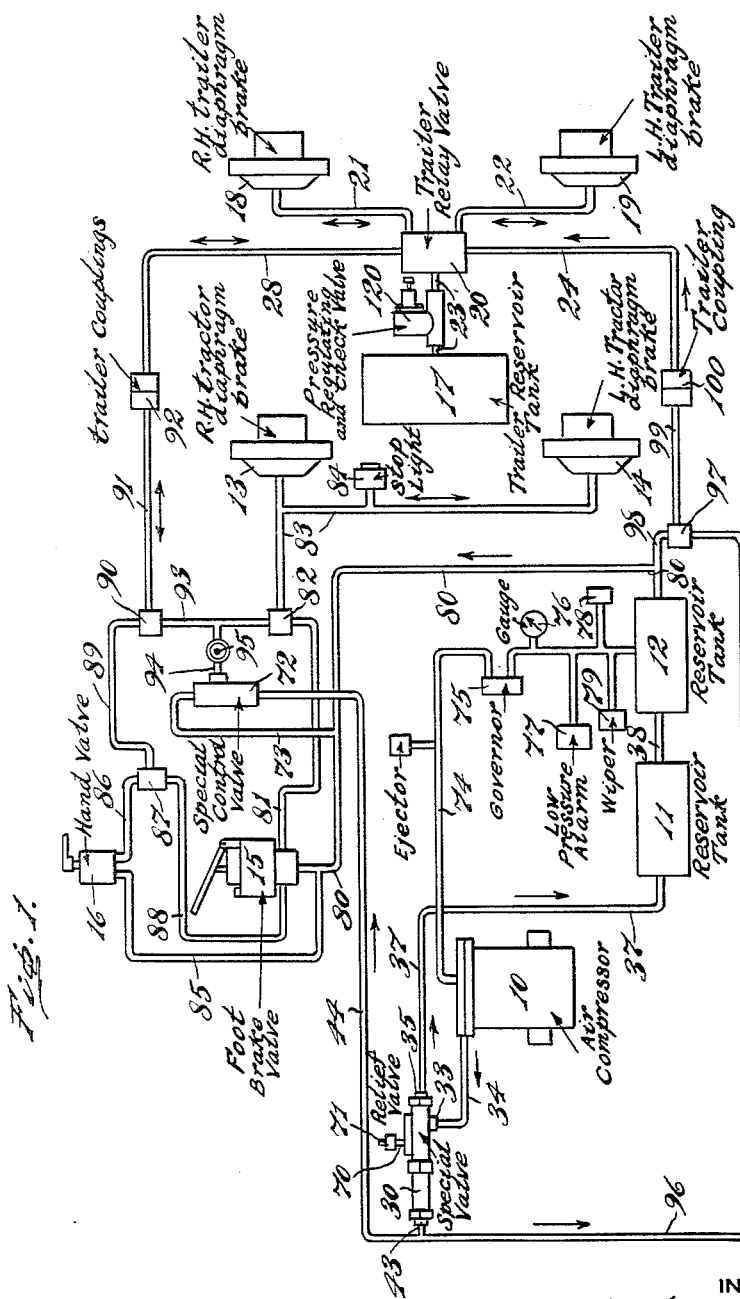
INVENTOR
Robert H. George
BY
Jas. C. Hobensmith
ATTORNEY May 31, 1960   R. H. GEORGE   2,938,753
AIR BRAKE SYSTEMS FOR AUTOMOTIVE VEHICLES
Filed Dec. 20, 1955   2 Sheets-Sheet 2
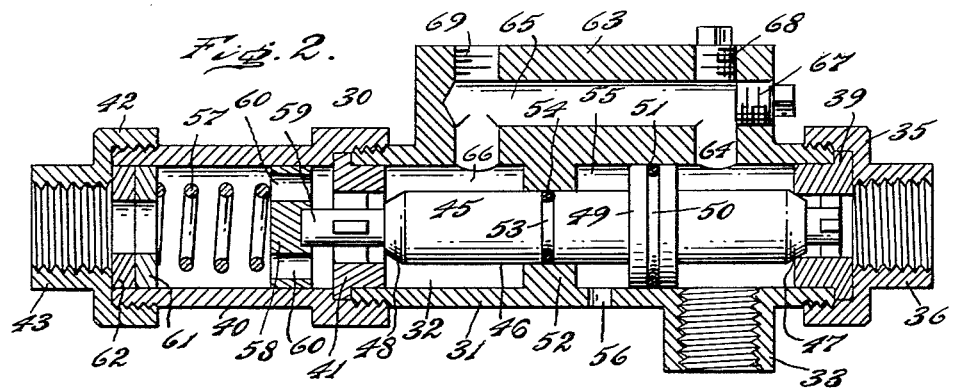
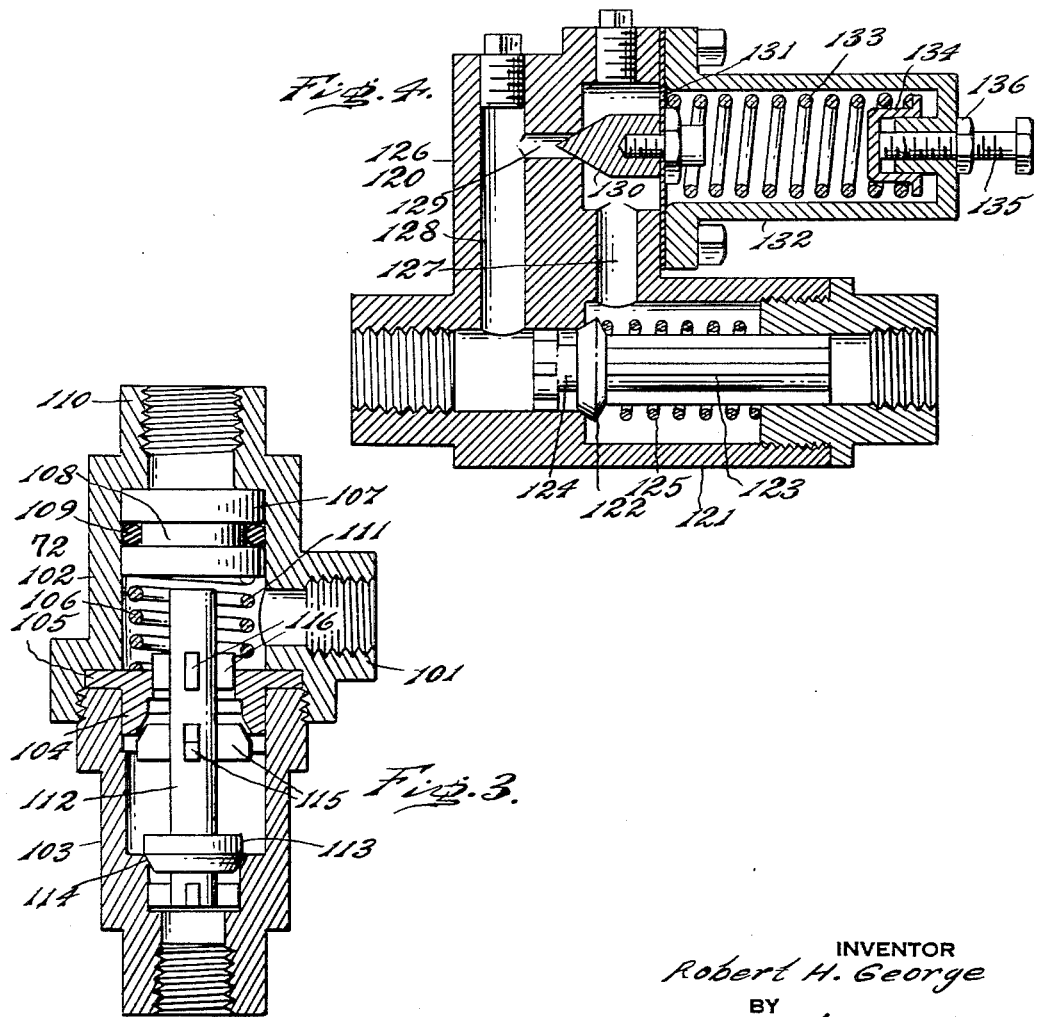
INVENTOR
Robert H. George
BY
Jas. C. Wobensmith
ATTORNEY.

United States Patent Office 2,938,753
Patented May 31, 1960

2,938,753

AIR BRAKE SYSTEMS FOR AUTOMOTIVE VEHICLES

Robert H. George, Melrose Park, Pa. (% George Manufacturing Co., 10 Harvey St., Philadelphia 44, Pa.)

Filed Dec. 20, 1955, Ser. No. 554,268

6 Claims. (Cl. 303—63)

This invention relates to air brake systems for automotive vehicles, and it relates more particularly to air brake systems adaptable for use on heavy vehicles such as trucks, buses, tractors, and tractor trailers.

In the use of heavy automotive vehicles many collisions and wrecks are caused by air brake failures, as well as by failures of the drivers to use the brake systems properly.

It is, of course, well known that when a compressor in a heavy vehicle air brake system is idling, as when drifting on a down grade, the supply of compressed air needed for proper braking is not ordinarily maintained sufficiently, and it is equally well known that when a truck or tractor, provided with an ordinary air brake system, has been standing for sometime, it frequently happens that, due to leakage in the system, air under sufficient pressure is not immediately available for braking purposes, and accidents frequently occur through failure of the operators to recognize these conditions.

It is a common practice for the operators of heavy vehicles, particularly on down grades, to indulge in a practice commonly called "fanning" which consists in making a number of light brake applications in succession. The effect of this practice is to reduce the available air pressure in the reservoir tanks to a point where there is no longer sufficient air under the requisite pressure to operate the brakes, and thereby to properly control the movement of the vehicle.

The normal air pressure commonly used in automotive practice has been from about 85 to 105 pounds per square inch, but as the vehicle loads are constantly becoming greater, there is a tendency for the operators to adjust the governor valves upward in an endeavor to maintain about 100 to 120 pounds pressure per square inch in the reservoir tanks.

Generally, the feeling of the operator is that, when the alarm, now required in new vehicles by Interstate Commerce regulations, is actuated, there is still some air available so that he can continue on to some point where the necessary correction can be made more conveniently. It is not generally understood by the operators that, for the purpose of obtaining a pressure of 100 pounds per square inch, the air must be compressed from approximately seven times the resulting volume.

When a brake application is made by use of the air from a reservoir carrying 100 pounds pressure, the use of the air in a single brake application will ordinarily result in a reduction of only 4 or 5 pounds due to the large volume compressed. However, when the air in the reservoir has been reduced to about 60 pounds, each brake application will ordinarily reduce the available pressure by more than double the reduction when operating at the above mentioned higher pressure.

It will therefore be easily understood that whenever the air in the reservoir tank falls to below the minimum safe pressure, the subsequent use of the brakes will quickly reduce the pressure to a point where the brakes will no longer be operative, with the resultant loss of control and danger of collision.

With the foregoing in view, the principal object of the present invention is to provide certain improvements in air brake systems of heavy automotive vehicles whereby the brakes will be automatically applied in the event of diminution of the pressure in the reservoir tanks below a predetermined amount.

A further object of the present invention is to provide in an air brake system, of the character aforesaid, an arrangement whereby air under pressure will be automatically passed from the compressor directly to the brakes for the purpose of actuating the same whenever there is little or no air under sufficient pressure in the reservoir tank available for such purpose, and this without any action or control by the operator.

A further object of the present invention is to provide an air brake system, of the character aforesaid, which will be applicable to automotive vehicles of various types and, particularly, to those in which a detachable trailer is coupled to a tractor.

A further object of the present invention is to provide, in an air brake system of the character aforesaid, a novel arrangement of parts, whereby said systems may, with but little change, be caused to operate safely under the various conditions occurring in practice.

The nature and characteristic features of the present invention will be more readily understood from the following description taken in connection with the accompanying drawings forming part hereof, in which:

Figure 1 is a diagrammatic view of an air brake system for heavy automotive vehicles embodying the main features of the present invention, the particular arrangement therein shown being applicable to tractor and trailer type vehicles;

Fig. 2 is a longitudinal central sectional view of a special valve used in the brake system of the present invention, the same comprising one of the principal novel devices of the invention;

Fig. 3 is a similar view of a special control valve comprising another of the novel devices of the present invention; and Fig. 4 is a view similar to Fig. 2 of a special valve comprising another of the novel devices of the present invention.

It should, of course, be understood that the description and drawings herein are illustrative merely, and that various modifications and changes may be made in the structure disclosed without departing from the spirit of the invention.

Referring to the drawings, in the particular embodiment of the invention therein shown, the general arrangement of the braking system of the present invention is in many respects similar to the arrangement commonly used in heavy automotive vehicles, and particularly those in which detachable trailers are employed in connection with tractors, the trailer braking system being coupled to the tractor braking system when the trailer and tractor are used together, and with the exception of the special valves employed and hereinafter more fully described, the other parts designated may be the same as, or very similar to, those at present in common use in heavy vehicle braking systems.

There is provided, of course, an air compressor or pump 10, and usually a pair of reservoir tanks 11 and 12 for receiving the air which is compressed by said compressor or pump 10. The tractor wheels (not shown) are provided with right and left hand air operated brakes 13 and 14 to and from which the air ordinarily passes under the control of the usual and ordinary foot operated brake valve 15, and also, a hand operated valve 16, which is provided to permit the operation of the trailer brakes independently of the tractor brakes in the usual manner.

In those instances in which a trailer, coupled to the tractor, is used, the trailer is ordinarily provided with a reservoir tank 17 from which the air under pressure may be transmitted to and from the right and left hand air operated trailer brakes 18 and 19 through the pipes 21 and 22 respectively under certain conditions.

The trailer is also provided with a so-called "relay valve" 20 connected in the usual and customary manner to the trailer brakes 18 and 19, by pipe lines 21 and 22, to the reservoir tank 17 by pipe line 23, and to the pipe line 24 for supplying the air to the trailer reservoir tank 17 from the main reservoir tanks 11 and 12 carried by the tractor, and to the pipe line 28 for controlling the passage of the air to and from the trailer brakes 18 and 19.

In air brake systems for heavy vehicles, as heretofore provided, it was customary to connect the air compressor directly to the main reservoir tanks, but in accordance with the present invention there is additionally provided a special valve 30 for by-passing the air coming from the compressor 10 directly to the brakes, whenever the pressure in the reservoir tanks falls below a predetermined amount. This valve is shown in detail in Fig. 2 of the drawings.

The special valve 30 comprises a main housing 31, having an internal cylindrical bore 32, and near one end of the housing 31 there is provided, on one side, an inlet nipple 33, for the purpose of connecting pipe line 34 which extends from the air compressor or pump 10.

On the end of the valve housing 31, adjacent the side inlet nipple 33, there is mounted a bonnet 35 having an outlet nipple 36 for the purpose of connecting a pipe line 37 extending to the reservoir tank 11 and through pipe line 38 to reservoir tank 12, for the normal maintenance of the air under pressure in said tanks.

The bonnet 35 also serves to maintain a flanged bushing 39 in position to provide a valve seat at that end of the housing 31.

At the other end of the housing 31 there is mounted a sleeve like extension 40 of the housing serving to hold and retain a flanged bushing 41 which provides a valve seat at that end of the housing 31.

Mounted on the end of the sleeve like extension 40 of valve 30 is a bonnet 42 provided with an outlet nipple 43 from which extends a pipe line 44 for a purpose to be presently explained.

Slidably mounted within the valve housing 31 is a valve member 45, the same comprising an elongated cylindrical portion 46 shaped at each end to provide valve faces 47 and 48, respectively, which are adapted to be alternatively seated, when operated as hereinafter set forth, on the valve seats provided by the flanged bushings 39 and 41 at the respective ends of the housing 31.

Intermediate the ends of the valve member 45 is an enlarged portion 49 constituting, in effect, a piston in which is provided, in an annular recess 50 therein, a packing ring 51 to prevent passage of the air past said piston like portion 49.

The interior of the housing 31 is also provided, with an inwardly projecting annulus 52, in conjunction with which the cylindrical portion 46 of the valve member 45 is provided with a groove 53, in which a packing ring 54 is located, to prevent the passage of air past said annulus 52. The annulus 52 is positioned within the bore 32 of the valve housing 31, a sufficient distance from the piston portion 49 of valve member 45 to provide a central chamber 55 which is in free communication with the exterior through a port 56.

The sleeve like extension 40, which is mounted on the end of the housing 31 remote from the inlet nipple 33, permits the mounting, in the valve structure, of a heavy coil spring 57, one end of which is seated against a head or guide member 58, which is mounted on the end of an extension 59, which projects from the end of valve member 45 through the valve seat bushing 41.

The head or guide member 58 is provided with passageways 60 to permit the flow of the air from the interior of the valve housing 31, through the sleeve like extension 39 thereof to the outlet nipple 43 to which the pipe line 44 is connected, when the valve face 48 is pushed from its seat by the coil spring 57.

The other end of the coil spring 57 bears against a ring member 61 which, as shown, is in turn seated on another ring member 62 of a similar size and shape. By substituting other ring members of different thicknesses, the tension of the coil spring 57 may be adjusted to the desired operating pressure.

The valve housing 31 is also provided, intermediate its ends, with an outwardly projecting portion 63 through which passageways 64, 65 and 66 are bored. Certain of the holes, through which tools are inserted for boring the aforesaid passageways, are closed by means of threaded plugs 67 and 68, whereas, one of said holes 69 is used for the connection of a pipe 70 leading to a relief valve 71 to prevent damage to the valve 30 in the event of the air reaching an abnormal pressure in that part of the system to which said relief valve is connected.

It will be noted that the valve member 45, in the absence of sufficient pressure in the reservoir tanks 11 and 12, will be impelled by the coil spring 57, to cause the valve face 47 of the valve member 45 to be seated on the bushing 39.

When the valve member 45 is in this position, air flowing from the compressor or pump 10 will pass around the valve member 45 and through the passageways 64, 65 and 66 to the other end of the housing 31, and as the valve face 48 provided at that end will then be moved from its seat the air will flow through the flanged bushing 41, through the passageways 60 in the head member 58, and through the sleeve 40 to the outlet nipple 43, and thence through pipe line 44 to special control valve 72.

When, however, the air brake system is functioning properly the air in the reservoir tanks 11 and 12 is of sufficient pressure to overcome the tension of the coil spring 57, the air from the compressor or pump will flow past the valve face 47 near the inlet end of the housing, thence through the flanged bushing 39, and through the nipple 36 to the pipe 37 connected thereto, directly to the reservoir tanks 11 and 12 for normal use when required from time to time.

The pipe line 44 extends to one end of the special control valve 72, the construction and arrangement of which is shown more particularly in Fig. 3 of the drawings and will hereinafter be described in detail. The other end of the special control valve 72 is connected to the reservoir tanks 11 and 12 as, for example, by means of a pipe 73 branching from pipe line 80, hereinafter referred to, which extends from the reservoir tanks 11 and 12.

The main control pipe line 74, which extends from the reservoir tank 12 to the compressor 10, and has connected thereto the compressor governor 75, also has, if desired, a pressure gauge 76, a low pressure alarm 77, an air starting motor 78, and a windshield wiper 79, all of which parts are operable through the pressure of the air coming from the reservoir tank 12.

The control of the brakes is ordinarily and usually effected by means of the air under normal operating pressure passing from the reservoir 12 through pipe line 80 to the foot operated brake valve 15 and thence, when the foot valve 15 is actuated, through pipe line 81 to a double acting check valve 82, to which is connected a pipe line 83 which extends to the tractor brakes 13 and 14, respectively.

A stop light switch 84 may be connected to the pipe line 83 to actuate the stop light whenever the air under pressure is applied to the tractor brakes in the usual manner.

For the purpose of providing the usual separate control of the trailer brakes whereby the same may be applied, when so desired, independently of the tractor brakes, there is provided a hand valve 16 to which a branch pipe 85 extends from the pipe line 80. The hand valve 16 is connected by pipe line 86 to a double acting check valve 87, which is also connected by pipe line 88 to the foot operated brake valve 15, for the operation of the trailer brakes simultaneously with the tractor brakes when the foot operated valve 15 is actuated.

A pipe line 89 extends from the double acting check valve 87 to another double acting check valve 90, which is connected by pipe line 91 to trailer coupling 92, which in turn is connected to the pipe line 28 which extends to the relay valve 20 of the trailer.

The double acting check valve 90 is cross connected by pipe line 93 to the double acting check valve 82, hereinbefore referred to, and this line 93 in turn is connected by pipe line 94 to a nipple 101 of the pressure control valve 72 shown in Fig. 3 of the drawings, and which will be hereinafter more fully described. The arrangement is such that when the air coming direct from the compressor is permitted to flow through the special valve 30, and pipe line 44, to control valve 72, said air under pressure coming from the compressor will be applied to the tractor brakes and to the trailer relay valve 20 to cause the trailer brakes to be operated.

The special control valve 72, which is shown more particularly in Fig. 3 of the drawings comprises a housing made of two parts, 102 and 103, having an internal bushing 104 provided with a flange 105, which is gripped between the abutting portions of the housing parts 102 and 103.

The interior of the housing part 102 is bored through, as at 106, to provide a cylinder in which a piston 107 is slidably mounted. The piston 107 is provided with an annular groove 108 in which a packing ring 109 is mounted to prevent leakage past the piston.

The portion 102 of the housing of special valve 72 is provided, at the end thereof in which the piston 107 is located, with a nipple 110 to which the pipe line 73 is connected. A coil spring 111 is interposed between the piston 107 and the bushing 104, serving to impel the piston 107 to the end of the cylinder whenever the pressure in the reservoirs 11 and 12, and hence in the pipe line 80, to which pipe line 73 is connected, is not sufficient to overcome the tension of the spring 111.

The portion 103 in the housing of the valve 72 has a valve member 112 slidably mounted therein. The valve proper 113 is adapted to be impelled to a seat 114 whenever the pressure on the face of the piston at the end of the cylinder is sufficient for that purpose. The end of the portion 103 of the housing, in which the valve 113 is seated, has pipe line 44, which extends from the special valve 30 hereinbefore described, connected thereto.

The valve member 112 is provided, midway its extremities, with a shoulder portion 115, which is adapted to abut against the bushing 104 to limit the movement of the valve member 112. The abutment shoulder 115 is channelled lengthwise to permit the air to pass therethrough whenever the valve 113 is moved from its seat, by air under pressure coming through pipe line 44, and the housing part 102 is provided with a sidewise extending nipple 101 which is connected by pipe line 94, in which the pressure control valve 95 is interposed, and which is connected to pipe line 93.

The valve member 112 is also provided, where it passes through the center of the bushing 104, with guide lugs 116, for the purpose of insuring the proper alinement and seating of the valve 113. The end of the valve member 112 is adapted to be engaged by the piston 107 when the piston is actuated by air under pressure from pipe line 73.

The tension of the coil spring 111 is so related to the tension of the coil spring 57 of special valve 30 as to cause the special control valve 72 to stop the flow of the air to the brakes from the pipe line 44 whenever the air in the reservoir tank has been raised to a safe working pressure, whereby the brakes may be operated in the usual manner by the valves 15 and 16 without waiting for the air in the reservoir tanks to be raised to the normal and higher degree.

In the pipe line 94 there is interposed a pressure control valve 95 which is of the nature of a choke valve, the purpose of the same being to prevent the sudden application of air to the brakes whenever the same flows through the pipe line 94 at a relatively high pressure, as will be hereinafter more fully set forth. Valves of this type are available and no special form is necessary.

The pipe line 44, which extends from the nipple 43 of the special valve 30, is also connected by means of a pipe line 96 to a double acting check valve 97, which is connected by pipe line 98 to the line 80 which extends to the reservoir tank 12. A pipe line 99 extends from the double acting check valve 97 to the trailer coupling 100, which in turn is connected by pipe line 24 to the trailer relay valve 20.

Interposed in the pipe line 23, which extends from the trailer relay valve 20 to the trailer reservoir tank 17 is a pressure regulating check valve 120, of special construction, which is shown more particularly in detail in Fig. 4 of the drawings.

The special valve 120, used in connection with the trailer reservoir tank 17, comprises a housing having a tubular portion 121 in alinement with the pipe connections, and in this portion 121 there is slidably mounted a valve member 122 having a stem portion 123 which is fluted, and which is impelled to its seat 124 by a relatively light spring 125. This portion of the valve 120 operates somewhat in the nature of a check valve, stopping the flow of air into the trailer reservoir tank 17, but under certain conditions, permitting the outward flow of the air to actuate the brakes of the trailer when the pressure is built up in the tank 17 sufficiently for its intended purpose in the operation of the system.

The special valve 120 is provided, however, with a sidewise extending portion 126 provided with transversely extending ports 127 and 128, and a port 129 which provides a communication between the ports 127 and 128 under certain conditions as hereinafter set forth. The port 129 is normally closed by means of a valve member 130 carried by a flexible diaphragm 131 which is secured in place by means of a bonnet 132. The bonnet 132 forms an auxiliary housing for a relatively heavy spring 133, one end of which is seated against the diaphragm 131 and the other end of which is seated on a flanged cuplike member 134, which in turn is mounted on the inner end of an inwardly extending bolt 135 threaded in the outer end of the bonnet 132.

A lock nut 136 may be provided on the bolt 135 to hold the same in its adjusted position, the foregoing arrangement being such that whenever the pressure in the port 127 reaches a point sufficient to overcome the tension of the spring 133, the valve member 130 will be withdrawn from its seat, and the air under pressure will be permitted to flow through the ports 127, 129, and 128 into the trailer reservoir tank 17 for subsequent use in the regular manner.

The operation of the apparatus as hereinbefore described should now be readily understood.

Under normal running conditions the air in the tanks 11 and 12 will be maintained in the proper operating pressure, and also in the line 37, which extends to said tanks from the special valve 30, the air will be at substantially the same pressure as that in the tanks 11 and 12. This will cause the valve member 45 of special valve 30 to be actuated, through the pressure on the piston 49, and the end 47 of the valve member 45 which would otherwise be seated on the bushing 39 as shown in Fig. 2 of the drawings, will be moved from its seat against the tension of coil spring 57.

When the valve member 45 is thus actuated, the air coming from the compressor 10 will pass through the pipe 34, to the interior of the valve 30, and into the pipe 37 to maintain the proper pressure in the tanks 11 and 12 under the control of the governor 75 which is in the control pipe line 74.

When the system is functioning as aforesaid, under normal running conditions, the air from the tanks 11 and 12 will pass through pipe 98, double acting check valve 97, pipe line 99, and trailer coupling 100; thence through pipe line 24 to the trailer relay valve 20 of the trailer; and through pipe line 23 to the trailer reservoir tank 17 to maintain the proper pressure therein.

At this time, the valve member 122 of special valve 120 will be seated, but the air under the operating pressure, acting on the diaphragm 131 against the tension of the spring 133, will cause the valve member 130 to be moved from its seat to permit the air to pass through ports 127, 129 and 128, into the trailer reservoir tank 17 from which it may subsequently flow whenever required, for application to the trailer brakes, by moving the valve 122 from its seat 124 against the tension of the spring 125. The spring 125 being relatively light, will not appreciably interfere with the flow of the air from the tank 17 whenever the same is required.

Also, when the system is working under normal running conditions, whenever the operator desires to apply the brakes, this is done by the operation of the foot actuated valve 15, the air under pressure then flowing from tanks 11 and 12 through pipe line 80 to the foot operated brake 15; thence by pipe line 81 to the double acting check valve 82, thence by pipe line 83 to the tractor brakes 13 and 14.

At the same time, that is, when the foot actuated valve 15 is operated, the air under pressure will flow through pipe 88 to double acting check valve 87, thence by pipe line 89 to double acting check valve 90, thence by pipe line 91 to the trailer coupling 92, thence by pipe line 28 to the trailer relay valve 20, which, being actuated by the air under pressure coming through pipe line 28, will cause the air under pressure in the trailer reservoir tank 17 to flow through pipes 21 and 22 to the trailer brakes 18 and 19 respectively.

When the system is operating normally, the pressure in the trailer reservoir tank 17 will be maintained by the air under pressure flowing from the main reservoir tanks 11 and 12 to pipe 80, to pipe 98; through double acting check valve 97, pipe 99, trailer coupling 100, and pipe line 24 to the trailer relay valve 20, and thence through pipe 23, in which special valve 120 is located, to the trailer reservoir tank 17.

As is, of course, well understood, it is sometimes advisable to apply the trailer brakes independently of those on the tractor, for example, to prevent jack-knifing when the roads are wet, snowy or icy. This is ordinarily done through the operation of the hand valve 16, in which event the air will flow from pipe line 80, through pipe line 85, hand valve 16, pipe line 86, double acting check valve 87, pipe line 89 to the double acting check valve 90, and thence through pipe line 91, etc., to the trailer relay valve 20 for the operation of the trailer brakes as aforesaid, but independently of the tractor brakes.

The novel parts of the present invention are provided for the purpose of preventing the operation of the vehicle, whenever the pressure of the air in the reservoir tanks 11 and 12 falls below a predetermined safe limit, by the automatic application of the brakes, and the holding of the same in applied condition under such conditions.

It will be noted that whenever the pressure of the air in the reservoir tanks 11 and 12 falls below a predetermined safe limit, the relatively heavy spring 57 of special valve 30, bearing against the head or guide member 58, will impel the valve member 45 to the position shown in Fig. 2 of the drawings, whereupon the air coming through pipe 34 from the compressor 10, will pass through ports 64, 65 and 66, to the other end of the housing 31 of special valve 30, passing through the bushing 41, through the ports 60 in the head or guide member 58, and outwardly through the bonnet 42 and nipple 43 to pipe line 44, which extends to one end of the special control valve 72.

The pressure of the air coming through pipe line 44 from the compressor, will cause the valve member 113 to be moved from its seat 114, permitting the air to pass to the interior of the housing part 103 of special control valve 72, thence passing through the fluted stop member 115, through the bushing 104 to the interior of the portion 102 of the housing of the special valve 72. The air thus coming from the compressor 10 will pass, through nipple 110 to pipe line 94 which extends to the cross-connection line 93 extending between the double acting check valves 82 and 90 so that, in this manner, whenever the pressure in the reservoir tanks 11 and 12 falls below the predetermined safe amount, and the compressor continues to operate, the air coming from the compressor 10 will pass through the control valve 72 and thence through pipe line 93 to double acting check valves 82 and 90. The air passing through double acting check valve 82 will then pass through pipe line 83 to tractor brakes 13 and 14, and cause the same to be applied.

At the same time, the air passing through double acting check valve 90 will pass through pipe line 91, trailer coupling 92, pipe line 28 to the trailer relay valve 20, causing the same to be actuated to permit a portion of the air which is flowing through special valve 30, to pass through pipe line 96, double acting check valve 97, pipe line 99, trailer coupling 100, pipe line 24, through trailer relay valve 20, and thence through pipe lines 21 and 22 to the trailer brakes 18 and 19 to cause the same to be applied.

The brakes will thus be applied and remain applied until after the compressor has continued to operate for a sufficient length of time to build up and restore the pressure in tanks 11 and 12, and tank 17 to a safe minimum limit, and after this has occurred, the operator may release the brakes by a single actuation of the foot operated valve 15, and thus restore the system to condition for normal operation by the air coming from the tanks 11, 12 and 17.

It should, of course, be understood that when the system is functioning normally, the pressure in the pipe line 80 being transmitted through the pipe line 73 to the end of the special control valve 72 in which the piston 107 is mounted to overcome the pressure of the spring 111 and will engage the valve member 112 and cause the valve portion 113 thereof to be impelled to its seat 114, and thus prevent flow from pipe line 44 under normal operating conditions.

The spring 111 of the special control valve 72 is of such tension as to cause the valve member 113 thereof to be seated so that the brakes may be used in the normal manner as soon as a safe working pressure has been obtained in the reservoir tanks 11 and 12, and tank 17, without waiting for the pressure in said tanks to be raised to the higher degree maintained in said reservoir tanks in the normal operation of the system.

It should also be understood that whenever the pressure in the reservoir tanks falls below the safe minimum limit and the special valve 30 is actuated to cause the air coming from the reservoir flow into pipe line 44, at the same time a portion of the air will flow through pipe line 96, thence through double acting check valve 97, pipe line 99, coupling 100 and pipe line 24 to the trailer relay valve 20 for utilization in restoring the pressure in the trailer reservoir tank 17 to the normal operating amount.

I claim:

1. In an air brake system for automotive vehicles including an air compressor, an air reservoir tank, piping extending from said compressor to said tank, air operated brakes, piping extending from said tank to said brakes, and manually operable valve means for controlling the flow of air through the piping from said tank to said brakes for the ordinary operation thereof, the combination therewith of means for automatically causing the air to pass directly from the compressor to the brakes thereby to apply said brakes, and to maintain said brakes applied, when the pressure in the reservoir tank falls below a predetermined normal operating amount, said means comprising an automatic control valve connected to the piping which extends from the compressor to the tank, which valve normally has its valve member held in position by the tank pressure to permit the air to flow from the compressor to the tank, a spring tending to shift said valve member to stop the flow of the air to the tank, a pipe line extending from said control valve to the brakes through which the air from the compressor is diverted directly to the brakes when the valve member is shifted by the aforesaid spring, means in said control valve for causing the air from the compressor to pass to the reservoir tank after a predetermined pressure has been reached in said pipe line, and a second automatic control valve in said pipe line, said second automatic control valve being actuated by the tank pressure to prevent delivery through said pipe line to the brakes when the tank pressure reaches a value less than the normal operating amount.

2. In an air brake system for automotive vehicles of the tractor trailer type, including an air compressor, an air reservoir tank for the tractor, piping extending from said compressor to said tractor tank, air operated brakes on the tractor, an air reservoir tank for the trailer, air operated brakes on the trailer, piping extending from said tractor tank to said tractor brakes and said trailer brakes, a relay valve on the trailer, and manually operable valve means for controlling the flow of air through the piping from said tanks to said brakes for the ordinary operation thereof, the combination therewith of means for automatically causing the air to pass directly from the compressor to the brakes thereby to apply said brakes, and to maintain said brakes applied, when the pressure in the tractor tank falls below a predetermined normal operating amount, said means comprising a first automatic control valve connected to the piping which extends from the compressor to the tractor tank, which valve normally has its valve member held in position by the tractor tank pressure to permit the air to flow from the compressor to the tractor tank, a spring tending to shift said valve member to stop the flow of the air to the tractor tank, a pipe line extending from said first automatic control valve to the tractor brakes through which the air from the compressor is diverted directly to the tractor brakes when the valve member is shifted by the aforesaid spring, means in said first control valve for causing the air from the compressor to pass to the tractor tank after a predetermined pressure has been reached in said pipe line, a second automatic control valve in said pipe line, said piping from said tractor tank to said brakes having a pipe line extending therefrom to said second automatic control valve for applying the tank pressure at said second control valve to prevent air delivery through said first pipe line to the brakes when the tank pressure reaches a value less than normal operating value.

3. In an air brake system for automotive vehicles of the tractor trailer type, including an air compressor, an air reservoir tank for the tractor, piping extending from said compressor to said tractor tank, air operated brakes on the tractor, an air reservoir tank for the trailer, air operated brakes on the trailer, piping from said tractor tank to said tractor brakes and said trailer brakes, a relay valve on the trailer, and manually operable valve means for controlling the flow of air through the piping from said tanks to said brakes for the ordinary operation thereof, the combination therewith of means for automatically causing the air to pass directly from the compressor to the brakes thereby to apply said brakes, and to maintain said brakes applied, when the pressure in the tractor reservoir tank falls below a predetermined normal operating amount, said means comprising a first automatic control valve interposed in the piping which extends from the compressor to the tank, which valve normally has its valve member held in position by the tractor tank pressure to permit the air to flow from the compressor to the tractor tank, a spring tending to shift said valve member to stop the flow of the air to the tractor tank, a pipe line extending from said first control valve to the tractor brakes through which the air from the compressor is diverted directly to the tractor brakes when the valve member is shifted by the aforesaid spring, means in said first control valve member for causing the air from the compressor to pass to the tractor reservoir tank after a predetermined pressure has been reached in said pipe line thereby to restore the air in said tractor tank to normal operating pressure, and a second automatic control valve in said pipe line said piping from the tractor tank to said brakes including a pipe line extending therefrom to said second automatic control valve for applying at said second automatic control valve the normal operating tractor tank pressure to close said valve and prevent delivery through said first pipe line to said brakes upon attainment of a predetermined pressure in said tank, said piping from said tractor tank to said brakes including a fluid connection to the trailer brakes, thereby to cause the trailer brakes to be applied simultaneously with the tractor brakes when the pressure in the tractor and trailer reservoir tanks falls below the predetermined normal operating amount.

4. In an air brake system for automotive vehicles of the tractor trailer type, including an air compressor, an air reservoir tank for the tractor, piping extending from said compressor to said tractor tank, air operated brakes on the tractor, an air reservoir tank for the trailer, air operated brakes on the trailer, piping extending from said tractor tank to said tractor brakes and to said trailer brakes, a relay valve on the trailer, and manually operable valve means for controlling the flow of air through the piping from said tanks to said brakes for the ordinary operation thereof, the combination therewith of means for automatically causing the air to pass directly from the compressor to the brakes thereby to apply said brakes, and to maintain said brakes applied, when the pressure in the tractor reservoir tank falls below a predetermined normal operating amount, said means comprising a first automatic control valve connected to the piping which extends from the compressor to the tractor tank, which valve normally has its valve member held in position by the tractor tank pressure to permit the air to flow from the compressor to the tractor tank, a spring tending to shift said valve member to stop the flow of the air to the tractor tank, a pipe line extending from said first control valve to the tractor brakes through which the air from the compressor is diverted directly to the tractor brakes when the valve member is shifted by the aforesaid spring, means in said first control valve for causing the air from the compressor to pass to the tractor reservoir tank after a predetermined pressure has been reached in said first pipe line, a second automatic control valve in said pipe line, said piping from said tractor tank to said brakes having a pipe line extending therefrom to said second automatic control valve for applying the tank pressure at said second automatic control valve to close said valve and prevent air delivery therefrom to the brakes, said piping from the tractor tank to the brakes including fluid connections to the trailer relay valve and to the trailer reservoir tank thereby to cause the trailer brakes to be applied simultaneously with the tractor brakes when the pressure in the tractor and trailer reservoir tanks falls below the predetermined normal operating amount.

5. In an air brake system for automotive vehicles of the tractor trailer type, including an air compressor, an air reservoir tank for the tractor, piping extending from said compressor to said tractor tank, air operated brakes on the tractor, an air reservoir tank for the trailer, air operated brakes on the trailer, piping extending from said tractor tank to said tractor brakes and to said trailer brakes, a relay valve on the trailer, and manually operable valve means for controlling the flow of air through the piping from said tanks to said brakes for the ordinary operation thereof, the combination therewith of means for automatically causing the air to pass directly from the compressor to the brakes thereby to apply said brakes, and to maintain said brakes applied, when the pressure in the tractor reservoir tank falls below a predetermined normal operating amount, said means comprising a first automatic control valve connected to the piping which extends from the compressor to the brakes, which valve normally has its valve member held in position by the tractor tank pressure to permit the air to flow from the compressor to the tractor tank, a spring tending to shift said valve member to stop the flow of the air to the tractor tank, a pipe line extending from said first control valve to the tractor brakes through which the air from the compressor is diverted directly to the tractor brakes when the valve member is shifted by the aforesaid spring, means in said first control valve for causing the air from the compressor to pass to the tractor reservoir tank after a predetermined pressure has been reached in said pipe line thereby to restore the air in said tractor tank to normal operating pressure, a second automatic control valve in said pipe line, said piping from said tractor tank to said brakes having a pipe line extending therefrom to said second automatic control valve for applying the tractor tank pressure at said second automatic control valve to close said valve and preventing air delivery therethrough to the brakes, said piping from said tractor tank to said brakes including fluid connections from said first pipe line to the trailer relay valve and to the tractor reservoir tank and a fluid connection from the trailer relay valve to the trailer reservoir tank, thereby to cause the trailer brakes to be applied simultaneously with the tractor brakes when the pressure in the tractor and trailer reservoir tanks falls below the predetermined normal operating amount, and said piping from said tractor tank to said brakes also having a branch pipe line extending from said first pipe line to the fluid connection which extends from the tractor reservoir tank to the trailer relay valve.

6. In an air brake system for automotive vehicles of the tractor trailer type, including an air compressor, an air reservoir tank for the tractor, piping extending from said compressor to said tractor tank, air operated brakes on the tractor, an air reservoir tank for the trailer, air operated brakes on the trailer, piping extending from said tractor tank to said brakes, a relay valve on the trailer, and manually operable valve means for controlling the flow of air through the piping from said tanks to said brakes for the ordinary operation thereof, the combination therewith of means for automatically causing the air to pass directly from the compressor to the brakes thereby to apply said brakes, and to maintain said brakes applied, when the pressure in the tractor reservoir tank falls below a predetermined normal operating amount, said means comprising an automatic control valve connected to the piping which extends from the compressor to the tractor tank, which valve normally has its valve member held in position by the tractor tank pressure to permit the air to flow from the compressor to the tractor tank, a spring tending to shift said valve member to stop the flow of the air to the tractor tank, a pipe line extending from said first control valve to the tractor brakes through which the air from the compressor is diverted directly to the tractor brakes when the valve member is shifted by the aforesaid spring, means including said first control valve for causing the air from the compressor to pass to the tractor reservoir tank after a predetermined pressure has been reached in said pipe line thereby to restore the air in said tractor tank to normal operating pressure, a second automatic control valve in said pipe line extending from the first automatic control valve to the tractor brakes, said piping from said tractor to said brakes including a pipe line extending therefrom to said second automatic control valve for applying the tractor tank pressure at said second automatic control valve to close said valve and prevent air delivery therethrough to the brakes, said piping from said tractor tank to said brakes also having a branch pipe line extending to the trailer relay valve from said first pipe line to the tractor brakes, a pipe line extending from the tractor reservoir tank to the trailer relay valve, and a pipe line connecting the trailer relay valve to the trailer reservoir tank thereby to cause the trailer brakes to be applied simultaneously with the tractor brakes when the pressure in the tractor and trailer reservoir tanks falls below the predetermined normal operating amount, and a third automatic control valve interposed in the pipe line between the trailer relay valve and the trailer reservoir tank, said valve being normally open when the pressure in the trailer reservoir tank is greater than a predetermined amount and closed to cause the trailer brakes to be applied by air passing from the compressor to the brakes when the pressure in the trailer reservoir tank falls below the predetermined normal operating amount.

References Cited in the file of this patent

UNITED STATES PATENTS

| | | |
|---|---|---|
| 1,797,431 | Mathieson | Mar. 24, 1931 |
| 2,402,115 | Levy | June 11, 1946 |
| 2,578,388 | Ambler | Dec. 11, 1951 |
| 2,680,500 | Jenkins | June 8, 1954 |
| 2,792,916 | Williams | May 21, 1957 |
| 2,834,638 | George | May 13, 1958 |